Figure 1:
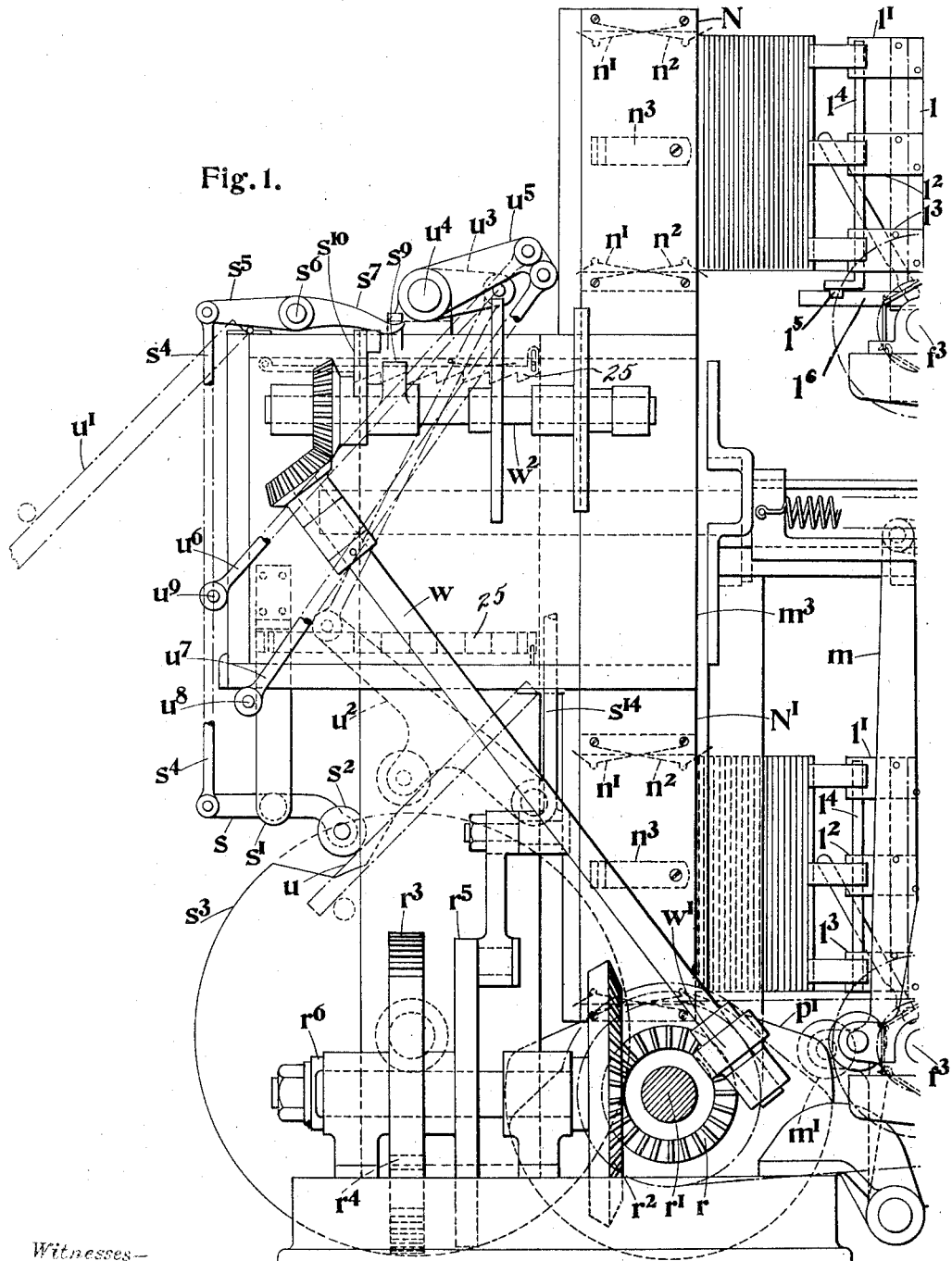

G. W. MASCORD.
COLLECTING AND STACKING MACHINE.
APPLICATION FILED NOV. 4, 1910.

997,201.

Patented July 4, 1911.
5 SHEETS—SHEET 1.

Witnesses—
Stanley Wood
H. A. Blake

Inventor
George William Mascord by
W. E. Evans.
Attorney.

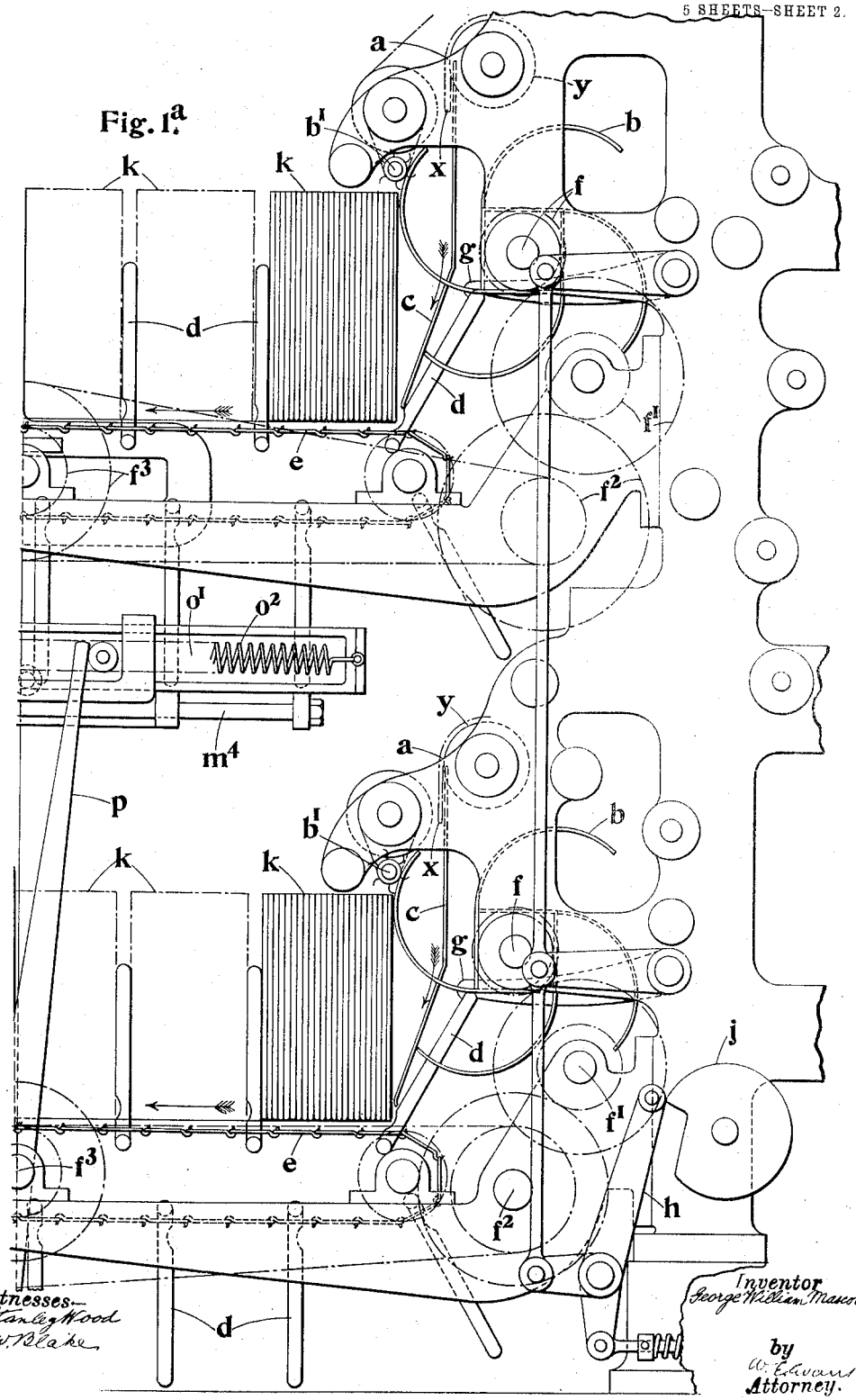

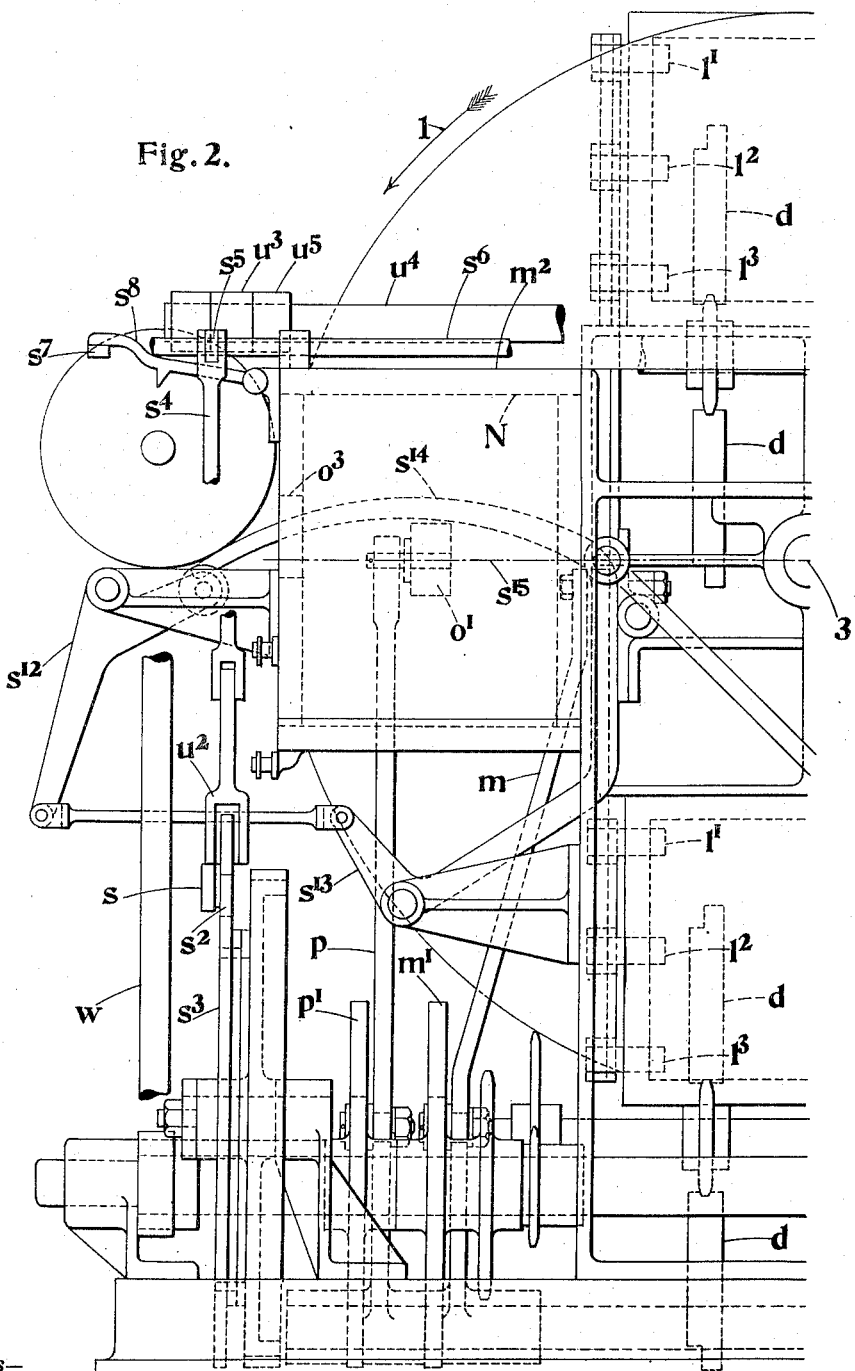

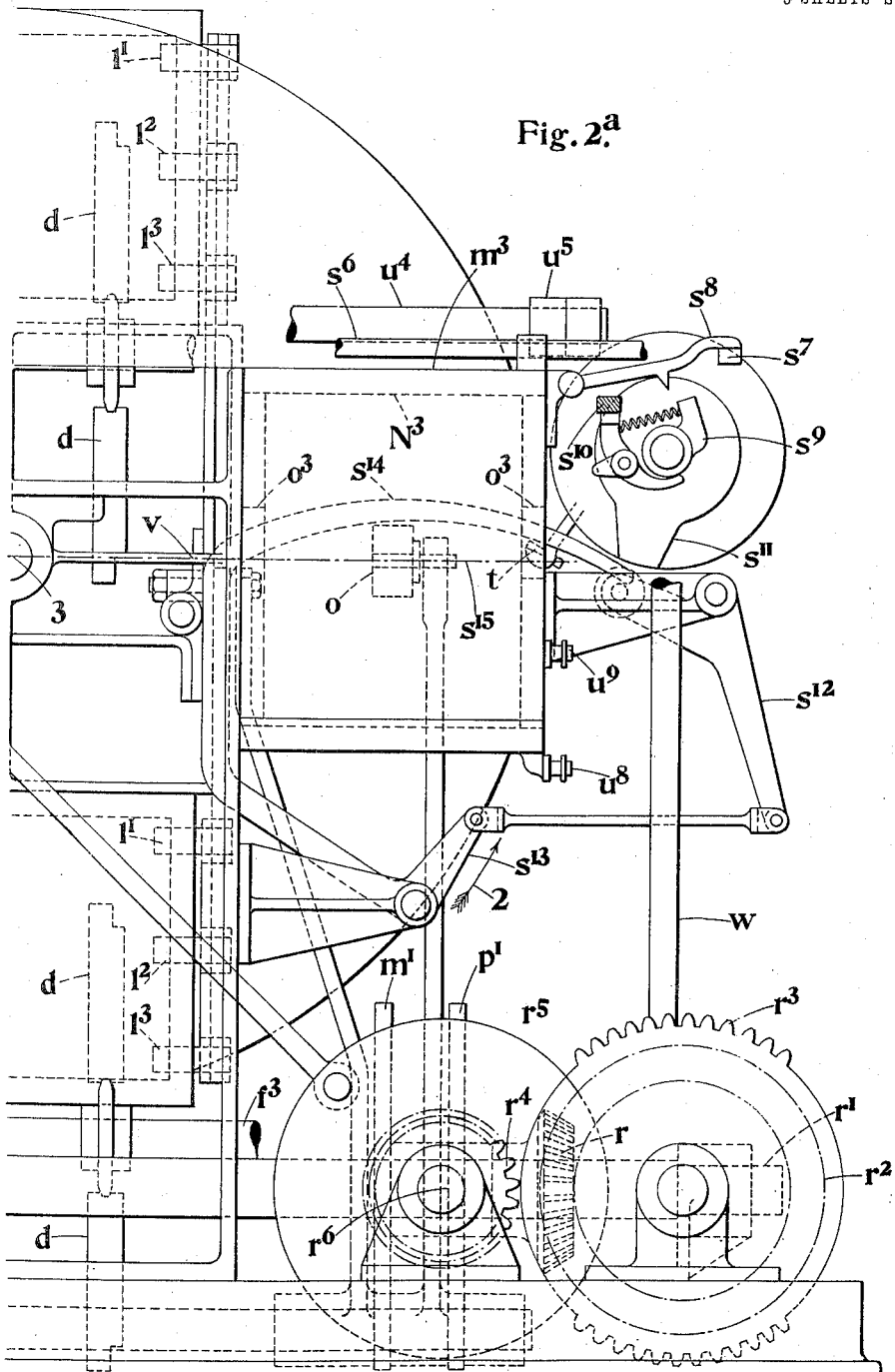

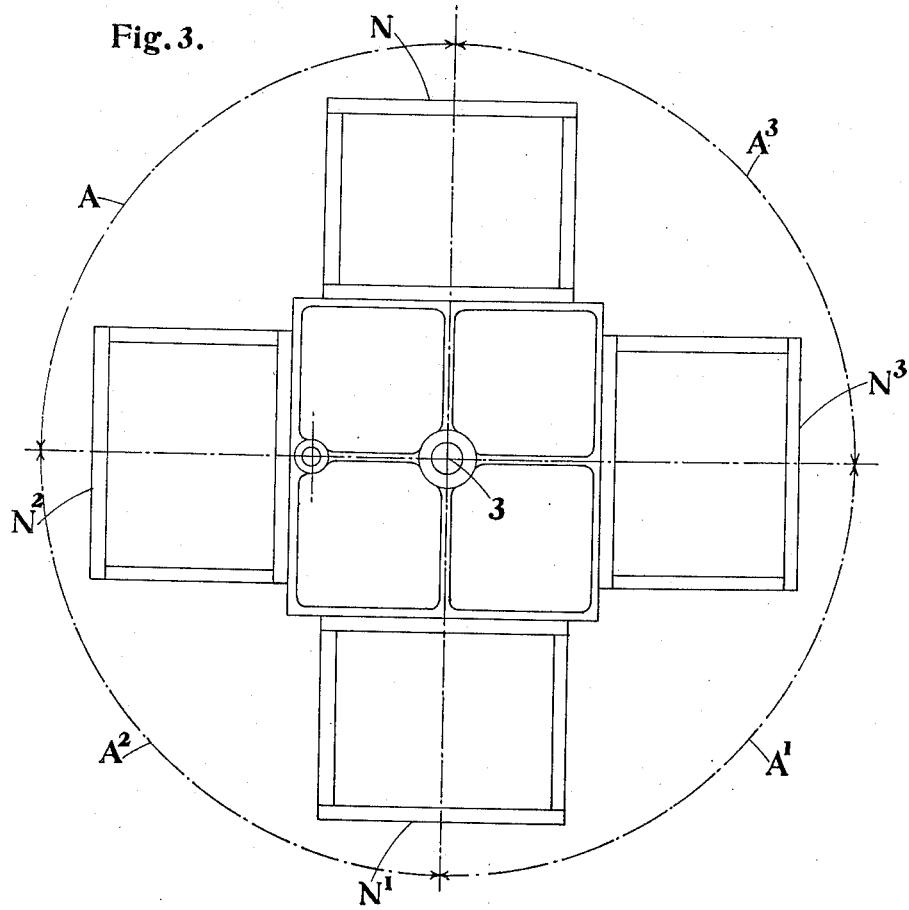

UNITED STATES PATENT OFFICE.

GEORGE W. MASCORD, OF LONDON, ENGLAND.

COLLECTING AND STACKING MACHINE.

997,201.  Specification of Letters Patent.  Patented July 4, 1911.

Application filed November 4, 1910. Serial No. 590,651.

*To all whom it may concern:*

Be it known that I, GEORGE WILLIAM MAScord, a subject of the King of Great Britain and Ireland, residing at 5, the Crescent, Barnes, London, England, mechanician, have invented certain new and useful Improvements in Collecting and Stacking Machines, of which the following is a specification.

This invention relates to means for collecting, stacking and bundling a printed or folded product such as a newspaper, and has for its object to provide an improved automatically operating mechanism for this purpose, consisting in the combination and arrangement of parts as hereinafter described.

The accompanying drawings represent the preferred method of carrying the invention into effect in a rotary newspaper printing machine with two points of delivery situated one above the other.

Figures 1 and $1^a$ are a side elevation. Figs. 2 and $2^a$ are a front elevation. Fig. 3 is a diagram illustrating the path of the transfer receptacles.

$a$ is the normal point of delivery from the folding cylinders in a machine of the class referred to.

$b$ are rotary delivery fingers or "fliers" of a well-known type.

$c$ is a flexible guide for assisting the retention of the product in a vertical position.

$d$ are movable "stops" or fingers suitably shaped or formed by which the product or folded newspaper is supported in a vertical position and which also perform the function of dividing the same into selected blocks or "quires" of such number as may be requisite, (in this instance 26 copies).

$e$ are the chains carrying the stops $d$ which are propelled continuously in the direction shown by the arrow. It will be understood that the chains $e$ receive their motion through gearing and shafts $f$, $f^1$, $f^2$, $f^3$.

$g$ is a trip lever operating to intermittently retain the stops $d$ during a definite period, controlled by the lever $h$ and cam $j$. The lever $h$ is retained in contact with the cam by a spring in a well-known manner. The stops or fingers $d$ are pivoted upon suitable links in the chain $e$ and are normally carried at right angles to the chains, being retained in the normal position by springs provided at the pivoted ends.

It will be understood that as the interval of time between the delivery of any two sheets is relatively very short (approximately 1/500 of one minute) the points or top ends of fingers $d$ must operate effectively in that period to divide any one copy from the following one. This is effected as here shown by the retention of the top end of the stops $d$ in a stationary position by the trip lever $g$ during part of the period while 26 copies or a selected number are accumulating, the lower end of the stop meanwhile continuing to move forward. It will therefore be clear that the greater the distance of the end of the stop radially from the chain the more rapid will be its movement when released, and that it will thus divide the product without retarding the same.

$k$ is the "quire" or selected number of the copies produced.

The copy $x$ (Fig. 1) is emerging from the delivery rollers and tapes $y$ and will follow the path approximately shown by the downwardly directed arrow. It will then have behind it one of the radial arms of the "flier" $b$ which latter will be so set or timed that it will upon nearly reaching its farthest radial path touch the top half of the rapidly dropping copy $x$ and push it forward out of the path of the copy to follow. The small fluted and rapidly revolving fan roller $b^1$ will propel the top end of the sheet or copy and prevent its return into the path of the copy following. When the selected number of copies are accumulated the following stop $d$ will move forward and create a division as shown. The quire will be moved forward as shown at Fig. 1 by the action of the chains until three quires are in position and the fourth partly collected.

$l$ is a carrier for clips or finger pieces $l^1$, $l^2$, $l^3$. The carrier $l$ is operated by the lever $m$ and cam $m^1$ and moves horizontally on guides $m^4$ backward toward the deliveries and forward to the stacking device. The fingers $l^1$, $l^2$, $l^3$, are mounted upon a vertical spindle $l^4$ which is cranked at one end, and carries a friction roller $l^5$ working on a cam shaped guide or former $l^6$ so that in its movement backward and forward it alternately grips a quire when at its backward end and withdraws so that upon its return from the forward stroke it will not engage or damage the succeeding quire. This is accomplished by a cam operating as before mentioned. It will thus be understood that the carrier $l$ controls the movement of the quires or blocks to the stacking member or receptacle N in which are flexible retaining stops $n^1$, $n^2$, $n^3$, &c. The forward stroke of the lever $m$ is continued until the front part of the quire or block reaches the limit or retaining stops $n^1$ $n^3$ the quire being pressed firmly past the retaining stop or non-return stop $n^2$. The carrier $l$ is then returned on the backward stroke to the following quire. Immediately the carriers withdraw the stacking members or receptacles N and $N^1$ then in vertical position (Fig. 2) turn in the direction of arrows 1 and 2 to the horizontal position so as to be opposite the plunger heads $o^1$ and $o$ respectively (Figs. 2 and $2^a$), when the plunger heads $o^1$ and $o$ will be released and move forward by the action of coiled springs $o^2$ following upon the stroke of the levers $p$ and cams $p^1$ (Fig. 2). As the plungers $o^1$ and $o$ are free to pass into and through the transfer boxes N and $N^1$ it will be observed that in its passage it will push the quires from N and $N^1$ into bundling boxes at $m^2$ and $m^3$. The latter are fitted with flexible ratchet shaped retaining or non-return stops 25 to prevent the quire or block from slipping or expanding and following the plunger heads $o$, $o^1$ upon the return stroke.

Assuming that the first pair of quires are being disposed of, that from the upper delivery will be carried in the direction of the arrow shown at 1 Fig. 2 with its cross fold next to the center stud 3 (Fig. 2) while that from the lower delivery will be carried in the direction of the arrow 2, and that with its fold away from the stud 3. The respective quires will then be transferred to the bundling boxes $m^2$ and $m^3$ in that position. During the period however two other quires will have been pushed into the transfer boxes $N^2$ in the lower position and $N^3$ in the upper position, as shown in Fig. 3 in which a double arrow A represents the path of transfer receptacle N, and arrows $A^1$, $A^2$, $A^3$ the limited path backward and forward of the respective transfer receptacles $N^1$ $N^2$ $N^3$. Upon the next quarter revolution the contents of $N^3$ will be transferred to bundling box $m^3$ and likewise the contents of $N^2$ will be transferred to bundling box $m^2$. As the folded product or quires leave the folder deliveries in the same vertical relation in each case i. e. with the cross fold on the lower side, it will be observed that the action above described results in the first pair being transferred to the bundling receptacles $m^2$, $m^3$ in one direction while the second pair will be transferred in the opposite direction and so equalize the parcel because as is well-known the folded edge is much more bulky and therefore tends to make a parcel unequal if the quires are not staggered in the way shown and described.

The intermittent oscillating motion of the transfer wheel (Fig. 3) is obtained by the use of an interrupted gear in a manner well-known as shown by a bevel pinion $r$ on the main shaft $r^1$ through a bevel wheel $r^2$ interrupted spur gear wheel $r^3$ on same shaft, geared to the pinion $r^4$ and a crank disk $r^5$ affixed to the same revolving on the stud $r^6$ when 5 quires more or less are collected in boxes $m^2$, $m^3$. The tying and knotting apparatus is controlled by the lever $s$ pivoted at $s^1$ with a friction roller $s^2$ rolling on a cam wheel $s^3$ and connected by a rod $s^4$ to an operating lever $s^5$ keyed on the shaft $s^6$, which operates the lever $s^7$ which in turn operates the clutch lever $s^8$ and clutch mechanism $s^9$ (Fig. $2^a$) in which upon raising the lever $s^8$ the clutch mechanism is put into operation, a constantly moving and power driven member $s^{10}$ being provided which when engaged operates a cam $s^{11}$, a lever $s^{12}$, a bell crank lever $s^{13}$, and needle bar $s^{14}$ (Fig. 2). The needle bar carries bundling twine or string behind the bundle as held in place by the plunger $o$ and through the space $o^8$ and ties or knots it at $t$ in a manner well-known. The line of twine or string is shown at $s^{15}$ lying in the path of the quires or bundles when being transferred to $m^2$ or $m^3$, and thus insuring the encircling of the bundle by means of the needle string supply and knotting mechanism. The tied bundle is then ejected by depressing the bottom or floor of $m^2$ or $m^3$ and opening the back thereof, as shown respectively at $u$ $u^1$, the operation being accomplished by means of a lever $u^2$ worked by the cam $s^3$ through a lever $u^3$ on a shaft $u^4$ to which are keyed levers $u^5$ operating connecting rods $u^6$, $u^7$, pivoted at $u^8$ $u^9$.

It will be understood that a roll or supply of string may be carried at any convenient position being fed in at point $v$.

The tying mechanism is operated by its own shaft $w$ by spiral gear $w^1$ geared up so that the shaft $w^2$ runs at a relatively high speed.

What I claim as my invention and desire to secure by Letters Patent is:—

1. A collecting and stacking machine comprising endless chains, fingers on said chains, means for preventing the fingers from assuming a vertical position until a certain number of the products have been collected between respective pairs of fingers, carriers, means for operating said carriers, a frame, receptacles in said frame, said receptacles adapted to receive the blocks of products from the carriers, and means for operating said frame in such manner that the blocks of products are collected by the respective receptacles alternately from the carriers so that the folded edges of the blocks of products are alternately disposed.

2. A collecting and stacking machine comprising endless chains, fingers on said chains, means for preventing the fingers from assuming a vertical position until a certain number of the products have been collected between respective pairs of fingers, carriers, means for operating said carriers, a frame, receptacles in said frame, said receptacles adapted to receive the blocks of products from the carriers, and means for operating said frame in such manner that the blocks of products are collected by the respective receptacles alternately from the carriers so that the folded edges of the blocks of products are alternately disposed, and means for discharging the blocks from the receptacles.

3. A collecting and stacking machine comprising endless chains, fingers on said chains, means for preventing the fingers from assuming a vertical position until a certain number of the products have been collected between respective pairs of fingers, carriers, means for operating said carriers, a frame, receptacles in said frame, said receptacles adapted to receive the blocks of products from the carriers, and means for operating said frame in such manner that the blocks of products are collected by the respective receptacles alternately from the carriers so that the folded edges of the blocks of products are alternately disposed, bundling boxes for receiving the blocks from the receptacles and means for discharging the blocks from the receptacles into the bundling boxes.

4. A collecting and stacking machine comprising endless chains, fingers on said chains, means for driving said chains, means for preventing the fingers from assuming a vertical position before a certain number of the products have collected between respective pairs of fingers, a frame, receptacles in said frame, means for transferring the products from between the fingers into the receptacles, said means comprising shafts, fingers on said shaft, carriers on which said shafts are mounted, a cam for imparting such a movement to the shafts that the fingers on the latter can be moved past the products and engage with the ends thereof, means for operating said carriers, means for oscillating said frame and means for discharging the products from the receptacles.

5. A collecting and stacking machine comprising endless chains, fingers on said chains, means for driving said chains, means for preventing the fingers from assuming a vertical position before a certain number of the products have collected between respective pairs of fingers, a frame, receptacles in said frame, means for transferring the products from between the fingers into the receptacles, said means comprising shafts, fingers on said shaft, carriers on which said shafts are mounted, a cam for imparting such a movement to the shafts that the fingers on the latter can be moved past the products and engage with the ends thereof, means for operating said carriers, means for oscillating said frame, said receptacles on the oscillation of the frame, alternately receiving the products from two separate endless chains, and means for discharging the products from the receptacles.

6. A collecting and stacking machine comprising endless chains, fingers on said chains, means for driving said chains, means for preventing the fingers from assuming a vertical position before a certain number of the products have collected between respective pairs of fingers, a frame, receptacles in said frame, means for transferring the products from between the fingers into the receptacles, said means comprising shafts, fingers on said shaft, carriers on which said shafts are mounted, a cam for imparting such a movement to the shafts that the fingers on the latter can be moved past the products and engage with the ends thereof, means for operating said carriers, means for oscillating said frame and means for discharging the products from the receptacles, bundling boxes for receiving the products from the receptacles and in which they are retained until a number of blocks of the products have been collected therein, and means for discharging the blocks of products from the receptacles into the bundling boxes.

7. A collecting and stacking machine comprising endless chains, fingers on said chains, means for driving said chains, means for preventing the fingers from assuming a vertical position before a certain number of the products have collected between respective pairs of fingers, a frame, receptacles in said frame, means for transferring the products from between the fingers into the receptacles, said means comprising shafts, fingers on said shaft, carriers on which said shafts are mounted, a cam for imparting such a movement to the shafts that the fingers on the latter can be moved past the products and engage with the ends thereof, means for operating said carriers, means for oscillating said frame and means for discharging the products from the receptacles, doors on said bundling boxes and means for opening said doors when the blocks of products are to be discharged.

8. A collecting and stacking machine comprising endless chains, fingers in said chains, means for preventing the fingers from assuming a vertical position until a certain number of the products have been collected between respective pairs of fingers, carriers, means for operating said carriers, a frame, receptacles in said frame, said receptacles adapted to receive the blocks of products from the carriers, and means for operating said frame in such manner that the blocks of products are collected by the respective receptacles alternately from the carriers so that the folded edges of the blocks of products are alternately disposed, and means for retaining the blocks of products in position in the receptacles.

9. A collecting and stacking machine comprising endless chains, fingers on said chains, means for preventing the fingers from assuming a vertical position until a certain number of the products have been collected between respective pairs of fingers, carriers, means for operating said carriers, a frame, receptacles in said frame, said receptacles adapted to receive the blocks of products from the carriers, and means for operating said frame in such manner that the blocks of products are collected by the respective receptacles alternately from the carriers so that the folded edges of the blocks of products are alternately disposed, and means for holding the edge of the product out of the path of the following product which is being delivered in the machine.

In testimony whereof I have hereunto signed my name to this specification in the presence of two subscribing witnesses.

GEORGE W. MASCORD.

Witnesses:
FREDERICK E. SQUIRE,
HERBERT D. JAMESON.